(12) United States Patent
Sinha

(10) Patent No.: US 7,081,434 B2
(45) Date of Patent: Jul. 25, 2006

(54) CHEMICAL FORMULATIONS FOR THE REMOVAL OF MERCURY AND OTHER POLLUTANTS PRESENT IN FLUID STREAMS

(76) Inventor: Rabindra K. Sinha, 609 Hancock Ct., McKees Rocks, PA (US) 15136-1167

( * ) Notice: Subject to any disclaimer, the term of this patent is extended or adjusted under 35 U.S.C. 154(b) by 118 days.

(21) Appl. No.: 10/292,078

(22) Filed: Nov. 12, 2002

(65) Prior Publication Data

US 2003/0104937 A1 Jun. 5, 2003

Related U.S. Application Data

(60) Provisional application No. 60/335,757, filed on Nov. 27, 2001.

(51) Int. Cl.
*B01J 20/00* (2006.01)
(52) U.S. Cl. ............... 502/400; 502/200; 502/218; 502/245; 502/247
(58) Field of Classification Search ........... 502/200, 502/201, 218, 222, 344, 245, 247, 400
See application file for complete search history.

(56) References Cited

U.S. PATENT DOCUMENTS

| 4,144,195 A | * | 3/1979 | Siebels ............... 502/241 |
| 4,474,896 A | * | 10/1984 | Chao ............... 502/216 |
| 4,902,662 A | * | 2/1990 | Toulhoat et al. ........ 502/216 |

* cited by examiner

*Primary Examiner*—Edward M. Johnson

(57) ABSTRACT

The invention provides compositions to remove mercury and other pollutants from a fluid stream,, particularly flue gases containing them. The composition is a mixture consisting of (a) polyhydroxy compound selected essentially from the group consisting of mono, di, poly saccharides and mixture thereof; (b) a catalyst selected essentially from the group of ammonium compounds, sulfuric acid, phosphoric acid and salts, zinc chloride, and mixture thereof; and (c) specificity producing compound selected from the group of elemental sulfur, sullides and polysulfides of ammonia and alkalies, compounds and metals of copper, silver, tin, gold, and mixture thereof. The polyhydroxy compound in (a) above, either alone or in conjunction with the third group (c), above is also shown effective to remove mercury and other pollutants from fluid streams. The composition can be liquid or dry powder. Methods are provided for applying the formulation.

1 Claim, No Drawings

CHEMICAL FORMULATIONS FOR THE REMOVAL OF MERCURY AND OTHER POLLUTANTS PRESENT IN FLUID STREAMS

Provisional Patent Application No. 60/335,757, Dated Nov. 27, 2001.

BACKGROUND OF THE INVENTION

This invention relates to formulations for removing mercury and other pollutants from fluid streams. Specifically, it provides formulations for mercury removal from gaseous streams known as combustion or flue gases of fossil and derived fuels. The flue gases of fossil and derived fuels contain mercury and other pollutants in small quantities because such fuels contain mercury and other pollutants in them. Sometimes, the process of combustion itself produces some pollutants such as carbon monoxide, oxides of nitrogen, dioxin, etc. In addition, some process streams may also contain mercury, other pollutants and substances that may require removal for one reason or the other.

The invention disclosed herein can be used to remove mercury and other pollutants from streams containing them as long as the temperature of the stream is above 200° F. The present invention is most suitable for the removal of mercury and other pollutants from combustion gases in boilers equipped with particulate control devices. The combustion of fossil and derived fuels, particularly solid fuels, and more particularly in the USA, is carried out in such boilers. For the present invention, the fossil fuels are defined as fuels such as coal, lignite, peat and fuel oil and the derived fuels are defined as municipal, industrial and pharmaceutical wastes and refuge.

Environmental considerations require that emissions of hazardous pollutants such as mercury and dioxin be contained. Most US coals and municipal refuge contain mercury in them which is released in the form of elemental and oxidized mercury with the combustion gases. Dioxin is generally produced during the combustion process from the precursor components present in the fossil or derived fuels. Unless the mercury and the precursors leading to the formation of dioxin are removed from the fuel prior to its combustion, they become a component of the gases produced by the combustion of the fuel and become extremely difficult to remove effectively and economically by known processes.

Coal (a term utilized in here to describe solid fuels such as bituminous and sub-bitumnous coals, anthracite, lignite and peat) is one of the most important fuels for producing power. It is burned in boilers all over the world to produce steam and electrical power. Power plants in the USA is estimated to burn more than 900 million tons a year of coal.

Coals contain many impurities including ash, sulfur, mercury, arsenic, selenium, berillium, boron, etc. When coal is burned in a furnace it is converted to carbon dioxide and water producing heat. The impurity such as ash remains behind as a residue while the majority of other impurities such as sulfur, mercury, arsenic, etc. leave with the combustion gases, also known as flue gases.

Depending upon the firing practices utilized, the ash is removed as bottom ash or as a combination of bottom and fly ash. The fly ash is that portion of the ash that becomes entrained in the combustion gases and moves around with them into the various parts of the boiler or combustion systems. Since the ash is entrained with the combustion gases, it is removed from the combustion gases before the gases are discharged into the atmosphere through chimneys or stacks. The separation of the entrained or the fly ash from the combustion gases is accomplished by utilizing particulate control devices such as cyclones, electrostatic precipitators, bag houses or their combinations.

Emissions of mercury from power plants, though minuscule in mass compared to ash and oxides of sulfur and nitrogen commonly referred to SOx and NOx, are targeted for control due to its tendency to bioaccumulate, and its potency as a neurotoxin.

The mercury is emitted from the stacks with the combustion gases in the form of elemental and oxidized mercury. The ratio between the elemental and the oxidized forms depends upon the type of the coal being burned and the equipment it is burned in. The ratio of the oxidized to the elemental (un-oxidized) forms of mercury when burning bituminous or eastern coals is higher than when burning sub-bituminous or western coals. The higher ratio when burning bituminous coals is believed due to the presence of a higher level of chlorides in the bituminous than sub-bituminous coals.

Many novel and unique methods are currently being evaluated to control the emission of mercury from the stack gases. Most of the processes require injection of a mercury specific sorbent(s) into the combustion gas stream. The sorbent is injected prior to the particulate control device(s) so that the sorbent containing the adsorbed mercury is removed by the particulate control device(s) together with the fly ash.

Among the sorbents tried have been powdered activated carbon, various chars, clays, zeolites, different types of fly ash, fly ash enriched with unburned carbon, etc. However, in the USA, as it is practiced commercially in the countries of Europe and Asia, powdered activated carbon is one of the most effective sorbents for mercury removal. The powder activated carbon is blown in by compressed air into the combustion gases upstream of the particulate control device where the gaseous temperature ranges between 250 and 800° F., depending on the particulate control device type. In the case of cold side electrostatic precipitators and bag houses the temperatures range is between 250 and 400° F. The hotside electrostatic precipitators operate around 800° F. The powder carbon works best when the gas temperatures are low and for that reason even in the coldside applications, sometimes, the flue gases are cooled by injecting a fine spray of water.

Sometimes, the carbon is specially modified by adding sulfur, iodine, chloride, etc. to make it more suitable to remove the mercuric form of mercury. Such specificity is introduced in the carbon either during its manufacturing or as a separate step after the carbon has been manufactured.

The ineffectiveness of carbon at high temperatures requiring gas cooling and introduction of specificity to the carbon adds to the overall cost of mercury removal. In addition, the costs of commercial carbons is a major factor in keeping the mercury removal costs unacceptable.

Unlike the aforementioned methods of mercury control, use of the compositions of the present invention provides an effective, effecient, and low cost means for controlling mercury and other pollutant emissions with very little limitations. The sorbents are generated in very fine, expected to be finer than pulverized, powdered form of activated carbon. The sorbents with or without the specificity producing components as described herein, are produced in-situ and are thus freshly produced, expected to be much more effective than powdered carbon which has been exposed to air and moisture during its storage and transportation to the site where the controls are needed. Moreover, use of these invented compositions fills an important need by reducing these emissions simultaneously from flue and process gases produced from the combustion of fossil or derived fuels. Because of these desirable characteristics, the present invention constitutes a significant advancement over prior control techniques.

SUMMARY OF THE INVENTION

The present invention provides compositions and methods for generating active sorbents in-situ in flue gas, upstream of the particulate control device, that are effective in removing the flue gas borne pollutants such as mercury, dioxin, etc. The pollutant laden sorbent is removed by the particulate control device together with the fly ash generated by the combustion of pollutant and ash bearing fuels.

The composition can be a liquid, if all the selected components are liquid at room temperatures or by dissolving them in a common solvent such as water, if soluble. It can also be a dry mixture of finely ground powders, if the components of the composition are solid at room temperatures, either by themselves or as a mixture with other powder diluents such as fly ash, clays including vermiculite, exfoliated or not, silica, alumina, zirconia, etc. The composition can also be made into a powder should any of the components selected be available as a liquid at room temperatures by mixing the liquid components with one or a mixture of diluent powders selected from the group of fly ash, clays including vermiculite, exfoliated or not, silica, alumina, zirconia, etc.

The sorbent is generated by adding the composition to the flue gas at a minimum temperature of 200° F., comprising a solution of polyhydroxy compounds with or without a catalyst and a sorbent specificity inducing/enhancing compound. The polyhydroxy compound provides the source for the sorbent generation, that is, it serves the purpose of being a sorbent precursor. The polyhydroxy compounds include but are not limited to glycerine, glucose, fructose, sucrose, lactose, molasses, cellulose, starches or their derivatives, whey, etc., and mixtures thereof The catalyst in the formulation may be mixed with the sorbent precursor as mentioned above, selected from a group consisting of ammonium nitrate, ammonium sulfate, sulfuric acid, phosphoric acid and its salts, zinc chloride, etc. The specificity inducer/enhancer may also form the part of the formulation containing the precursor with or without the catalyst consisting of but not limited to ammonium thiosulfate, ammonium polysulfide, sodium polysulfide, copper nitrate, copper chloride, copper carbonate, basic salts of copper carbonate and chloride, silver nitrate, stannous chloride, auric chloride, potassium tri-iodide, sulfur flour, metallic copper, silver, gold, etc. The composition with or without the catalyst and the inducer/enhancer is injected into the flue gas as a dry powder or when all components are soluble in a common solvent, then as a solution.

Injection of the invented composition in the form of a fine powder is facilitated by mixing the selected components of the composition as individual powders or when any of the componets is a liquid then thoroughly mixing the said liquid component with an inert material such as powdered clays, alumina, silica, coal ash etc., or mixtures thereof made to a free flowing powder and blowing the said powder into the flue gas stream. When all the components are available as solid powders at room temperatures, the composition can be mixed with other powders such as fly ash, clays, exfoliated or not, silica, etc., as diluents for the improved ease of injection and dosage control.

The sorbent is generated in the flue gas in-situ when the formulation as a liquid, consisting of either the precursor, precursor with the catalyst, precursor with the specificity inducer/enhancer, or mixture thereof, or a solution is injected as an atomized mist in the flue gas. When the gas temperature at which the composition is injected is below 400° F., the formulation may also contain the catalyst in it at an appropriate strength to accomplish the generation of the sorbent. The atomization of the formulation may be accomplished by utilizing commercially available dual fluid atomizers. The effectiveness of the generated sorbents may be further improved by decreasing the particle size of the atomized mist by proper control of the fluids flows, their atomizing pressures and by adjusting (lowering) the solids level of the formulation prior to its atomization.

When the formulation is a free flowing powder, it is blown in with or without a diluent such as fly ash, clays, silica, alumina, etc., with compressed air or a suitable vehicle into the flue gas at appropriate temperatures. The appropriate injection temperature may depend upon the source of the sorbent precursor, particularly when utilizing cellulosic or starch based sources, it may be higher than 600° F. and up to 2000° F.

DETAILED DESCRIPTION OF THE INVENTION

The compositions of the invention comprise one or more of the water soluble or dry powder of polyhydroxy compounds such as glycerine, glucose, fructose, molasses, lactose, whey, celluloses, starches or their derivatives as a source of the sorbent precursor effective for the removal of mercury and/or other pollutants from the flue gas stream containg the mercury and/or other pollutants in it. The precursor is mixed with a catalyst effective for generating the sorbent at temperatures ranging between 200 to 400° F. and a specifity inducing compound in the mixture. The catalyst in the formulation may not be mixed should the temperature of application be above 400° F. The specificity inducing compound is selected from a group of compounds, either alone or in mixtures thereof, such as sulfides, polysulfides and/or thiosulfates of ammonium or alkali metals, elemental sulfur, metals or salts of tin, copper, silver, gold and/or iodides or tri-iodides of alkali metals. The specifity inducing compound may also not be present in the formulation should it not be desired or required as determined by the gaseous composition of the flue gas, particularly whether the mercury is primarily present in the elemental or oxidized form. The formulation may be mixed with fly ash, clays such as bentonite, vermiculite, etc., silica, alumina, titania or zirconia either as an extender or to make the formulation more free flowing and easy to monitor and control the dosage of the formulation.

The composition, when in the liquid form, because all the selected components are available as liquids at room temperature or because the components are soluble in an inert solvent such as water, can be injected into the gas stream as a fine mist. The injection as a fine mist can be accomplished by utilizing devices common for generating mist out of a liquid formulation. For example, the liquid can be atomized by utilizing high mechanical shearing such as those produced by forcing the liquid, under pressure, through fine hole nozzles or by utilizing dual fluid nozzles where the liquid (fluid I) is atomized by compressed fluid (fluid II), for example air, steam or other gas.

When the components selected in making the formulation is available as solids, they can be ground separately or in combination to a fine powder and injected/blown into the gas stream at appropriate temperatures prior to the particulate collection device(s) by a suitable vehicle such as compressed air. The liquid components of the composition can also be made into a powder by mixing them separately or in combination with other dry powders such as fly ash, clays, silica, alumina, etc.

The solid components can also be made into a powder and mixed with diluents such as fly ash, clays, silica, etc., either individualy, in combination or the mixture of the formulation and the selected diluent(s) ground into a fine powder before injecting/blowing it into the gas streams.

Many variations of the above techniques, which by no means should be construed as restricting to making or using the formulation can be obvious to those trained in the art of making and using liquid or solid (powder) formulations.

EXAMPLES

The following examples further demonstrate the instant invention. These examples should not, however, be construed as limiting the instant invention in any way.

Example 1

To 100 gram of an aqueous solution containing 37% ammonium nitrate, 15% sodium nitrate and 1% Lithium nitrate, 5 gram sucrose was dissolved. 10 gm of the final composition was placed in a container. In a separate container 10 gram of 50% sucrose solution was placed. Both containers were put in an oven and the oven was heated in increments to increasing temperatures. The containers were observed and weight losses were recorded. The solutions started to lose weights rapidly around 150 to 180° F. They became very viscous and remained in a molten state. At around 205° F. the sugar formulation containing ammonium nitrate, etc. started to become very dark and by 210° F., it became extremely dark. Soon it became frothy, swelled up significantly and formed a dark, spongy looking mass at 220° F. The other sugar solution remained molten and did not even become darkened until the temperature reached above 300° F. It also swelled and darkened and charred rapidly around 350° F. This experiment indicated that nitrates and particularly when it is in combination with ammonium nitrate is effective in lowering the charring temperature of sugar (sucrose) from about 350° F. to around 220° F.

Example 2

Experiments were conducted with sugar solution alone or in combination with ammonium nitrate and various nitrate and nitrite salts but ammonium. In all samples that contained ammonium nitrate, the charring reaction ensued around 200° F. whereas in other sugar solutions even though when they contained other nitrates and nitrites in them the charring reaction did not proceed until the temperatures reached around 330° F. Ammonium nitrate was discovered from these experiments as the key ingredient necessary for the charring reaction in sugar to occur at lower temperatures than it occurs in sugar alone.

Example 3

Experiments were conducted with sugar solutions containing ammonium nitrate to sugar ratios as following: (A) 1.4 to 1, (B) 1 to 1, (C) 0.5 to 1.5, and (D) 0.1 to 10 by weight on dry bases. The formulation A, B, and C started to show discoloration around 155 to 165° F. and charred very rapidly at 250° F. Prep D on the other hand only darkened at 250° F. and solidified into a dark shiny mass. None of the chars produced from A, B, & C at 250° F. was water soluble whereas from the D, it appear to dissolve and produced a brown color, caramel like solution. Weight loss study indicated that the char yield increased with decreasing levels of ammonium nitrate in the prep. For example, prep A that has the highest level of ammonium nitrate but yielded the lowest char at 22.7%, B around 30.7% and C around 51%. This test indicates that the effectiveness of ammonium nitrate to catalyze the charring of sucrose is minimal when its concentartion reaches only 1% by weight in sugar.

Example 4

Formulations were prepared in which the sugar sources were other than sucrose, for example corn syrup, molasses and glycerine a trihydroxy compound. Ammonium nitrate in all cases catalyzed the charring of these precursor sources at a much lower temperature than the ammonium nitrate free precursor source. Additional tests with sucrose and ammonium nitrate indicated that sugar solution containing 10% ammonium nitrate by weight catalyzed the sugar charring reaction at 280° F. with about 81% char yield. 12.5% ammonium nitrate yielded a char weight of 77.9%. A charring temperature of around 280° F. with a char yield of about 80% is considered quite achievable in coldside ESP operation. A char yield of about 50% and above can be economical for applications where char is useful.

Example 5

Tests were conducted to evaluate the effectiveness of ammonium formate, ammonium acetate, and sulfuric acid as charring catalysts for sucrose and corn syrup. Charring of molasses were also briefly studied. 10 gram sugar with 10 gram water was mixed with 0.05 gram of 98% sulfuric acid and heated in an oven to different temperatures and weight losses recorded. The sulfuric acid treatment calculated out at about 0.5% of the sugar on dry basis. The yield of the char obtained was 71.5% at 290–300° F. When the sulfuric acid treatment levels were raised to 1% and 10% the char yields were 80% and 60%, respectively at 260+/−5° F. 1.2 gram 98% sulfuric acid was mixed with 49 gram of Karo grade corn syrup containing 12 gram sugar. This yielded 10% sulfuric acid treatment. The treated sample was heated to 260+/−5° F. Very little reaction happened in the beginning, showing 80% recovery in 15 minutes of maintaining at 260+/−5° F. Heating for an additional period of ~½ hour brought a vigorous reaction with bubbling and charring reactions taking place. The char yield of 50% was obtained. 45% ammonium acetate containing 5% sugar in water was heated in the oven. Very little weight, brown char-like, less than 5% of the original weight was left behind. 45% ammonium formate containing 5% sugar in water left behind a trace of char like material at 260° F. The experiments in this set indicated that ammonium fornate was least effective, ammonium acetate was partially effective but sulfuric acid was quite effective for charring both sucrose and corn syrup below 300° F.

Example 6

Charring experiments on starch showed that ammonium nitrate is quite effective in initiating charring. At 11% treatment with ammonium nitrate, starch started to decompose at as low a temperature as 240° F. whereas the starch without treatment did not even show any signs of decomposition up to 300° F. Wheat flour, Gold medal Brand, and Corn Starch from Best Foods were utilized as starch sources.

Example 7

Tests were conducted to evaluate whether ammonium sulfate can be a catalyst for charring sugar. Tests indicated that acqueous solutions of sugar containing 0.5% or more of ammonium sulfate in it can be charred at temperatures starting at 260° F. Tests with powder sugar and powder ammonium sulfate also showed the catalytic effects of ammonium sulfate on charring the sugar powder. The sorbent yield when catalysed by ammonium sulfate at 280 to 300° F. produced char yields of 70 to 80% of the original weight of the sugar used in the experiments. Chars prepared at 280° F. and above with ammonium sulfate appeared to be mostly chars since very little water soluble/dispersible compound, believed to be water soluble caramel, resulted when the char was mixed with water at room temperatures.

Example 8

Tests in this set were conducted on mercury removal. Samples containing the sorbent were prepared on fly ash obtained from power plants burning Eastern and lignite coals. The ash samples were treated with sucrose solution followed by charring to deposit the sorbent(s) on the specific ash. The selected ashes were first impregnated with the sugar and ammonium nitrate containing formulations. Two formulations (I & II) were prepared for the impregnation. Formulation (I) contained 25% ammonium nitrate, 0.1% sulfuric acid and 25% sucrose in water. Formulation (II) was prepared by mixing 40 grams of 50% (by wt.) sugar solution with 60 grams of a solution containing 35% ammonium nitrate, 15% Sodium nitrate, and 1% lithium nitrate, on wight basis, in water. The ashes were impregnated at two levels, 5% and 20% (by wt) with the above impregnants, formulation (I) and (II).

For 5% impregnation, 5 gram of the formulation was mixed with 25 gram water. This entire solution was then slowly added with mixing to 100 gram of the ash. Water was added into the pre-weighed solution to ensure good and homogeneous mixing with the ash. Mixing of the solution with the ash yielded a smooth paste like mixture. For 20% impregnation, 20 gram of the formulation was mixed with 10 grams of water before mixing with 100 gram of ash. The thoroughly mixed ash pastes containing 5% and 20% by weight of formulation (I) and (II) were first air dried, well mixed and a small amount (25 grams) was then heat treated at 300° F. for four hours. Heat treatment at 300° F. was to accomplish charring of the impregnated preparations. Blanks (containing no treatments in it) of the ash were prepared by taking 100 gram ash and mixing it with 30 grams of water only. The paste like blank materials were also first air dried, mixed and and 25 gram was then heat treated at 300° F. for four hours.

A small portion of the impregnated and heat treated ash sample (originally containing 20%, by weight, of formulation (II) was also doped with 5% by weight of sulfur to prepare a sulfur impregnated sorbent. For this 4.75 gram of heat treated ash was mixed with 0.25 gram of flower sulfur, mixed well and heated in a closed (sealed) glass container at 260° F. for one hour. This was called the sulfurized heat treated ash sample. Another sample of 4.75 gram heat treated ash was mixed with 0.25 gram of flower sulfur and was called sulfurized at room temperature.

The charred and sulfurized ash samples were tested for mercury removal at 300° F. and were compared with those of blanks, ash alone, and commercial grades of activated carbon. Commercially available (obtained from Calgon Carbon Corporation, Pittsburgh, Pa.) grades of BPL and HGR carbons were employed for this comparison tests. These carbons, normally available as 4×10 mesh material, was ground and sieved through 100 mesh U.S. standard screens.

3 grams of each sample was thinly spread on a watch glass and placed on the oven rack. The oven was sealed so no outside air could leak-in and any introduced air could only exit through the designated opening. Through a plurality of openings, air saturated with mercury at room temperature was introduced into the apparatus (hermatically sealed and thermally maintained at 300° F.) at the rate of 2 liters per minute. The samples were exposed to room temperature saturated air at above temperature and flow rate for 125 hours. The air flow was terminated after 125 hours of exposure, the oven was cooled to room temperature and samples analysed for mercury content in them. The results are presented in Table 1 below:

TABLE 1

Mercury pick-up by Prepared Samples

| Sample Designation | Sample Description | Hg Level, ppm |
|---|---|---|
| ES-B | Eastern Ash Sample, Blank (without any treatment) | 0.04 |
| Lig-B | Lignite Ash Sample, Blank (without treatment) | 0.02 |
| ES-5-I | Eastern ash @ 5% impregnation with Formula (I) | 0.04 |
| ES-20-II | Eastern ash @ 20% impregnation with Formula (II) | 0.09 |
| ES-5-I-Dup1 | ES-5-I as duplicate number 1 | 0.03 |
| ES-5-I-Sulf | ES-5-I containing 5% sulfur (260° F. heat treated) | 0.06 |
| ES-20-II-sulf | ES-20-II containing 5% sulfur (260° F. heat treated) | 0.06 |
| ES-5-I-sulf-RT | ES-5-I containing 5% sulfur at room temperature | 0.05 |
| ES-5-I-Dup2 | ES-5-I as duplicate number 2 | 0.04 |
| Lig-5-I | Lignite ash @ 5% impregnation with Formula (I) | 0.02 |
| BPL | BPL Grade Commercial carbon | 0.2 |
| BPL-B | BPL carbon as is, Base without exposure to Hg | 0.16 |
| HGR | HGR Grade Commercial carbon | 0.17 |
| HGR-B | HGR carbon as is, Base without exposure to Hg | not tested |

The data presented in the above table indicate that at 300° F. (a) Eastern ash (blank) absorbs twice the level of mercury than the lignite ash (blank), (b) 5% impregnation (followed by charring) does not appear to be more effective than the corresponding blank ashes, (c) 20% impregnation (followed by charring) shows the most sorption of mercury, or a net of 0.09−0.04=0.05 ppm over the blank, (d) the BPL carbon showed a pick-up of 0.2−0.16=0.04 ppm of mercury whereas no inference on pick up by HGR carbon can be made as the unexposed sample was not analysed. In conclusion, sorbent impregnation at levels more than 5% impregnant is effective for mercury sorption.

Example 9

Tests were conducted for mercury removal by fly ash containing the sorbents by a test developed for the Electric Power Research Institute (EPRI) by an Austin, Tex. based company called URS. Fly ashes produced by burning Easter and Western coals were selected for this test. The ash samples were impregnated with 50% sucrose containing 6.3% ammonium nitrate in water. 2.5 gram of the sucrose/ammonium nitrate solution was first mixed with about 0.5 and 2 gram water, for eastern and western ash, respectively and then the diluted solution was mixed thoroughly with 25 gram of the ash. After air drying, the impregnated ash was lightly dried at 120–130° F. The ash was mixed together by a spatula to keep the consistency of the partially dried sample to that of a powder. 0.25 gram of flower sulfur was added and mixed well to each of the partially dried, impregnated ash sample. The ash samples were then heat treated at 320° F. to char the sugar and coat the ash particles with the char sorbent. Both samples were kept at this temperature for an hour after which the oven temperature was raised to 410° F. and left at this temperature for an additional hour. Both ash samples were then cooled and and ground to pass through 100 mesh standard screen. The two impregnated (assumed to have about 2% by weight of charred sorbent in the respective ashes) samples together with the unimpregnated ashes and a commercial activated carbon by Norit corporation designated as FGD were tested by URS for elemental and ionized mercury capacities in a special device.

The mercury adsorption/removal tests were conducted at 275° F. in a flowing test apparatus. The sorbent, in this case containing ~2% sorbent in the fly ash, was mixed with quartz (−50+70 mesh) at the rate of between 10 and 30 mg sample (as prepared sorbent in ash), placed as a column 0.5" dia×2" deep and maintained at 275° F. The simulated flue gas mixture consisted of about 400 ppm of sulfur dioxide, 400 ppm of nitric oxide, 7% moisture, 12% carbon dioxide, 5% oxygen, 2 and 50 ppm of hydrogen chloride (depending upon whether the test was for elemental or oxidized mercury) in balance nitrogen. The simulated gas was additionally doped with mercury either as elemental or as $HgCl_2$ at about 30 micrograms of mercury per $Nm^3$ of gas was passed through the column at about 1 liter per minute until 100% breakthrough of mercury from the column occurred. The capacity of mercury was determined from the area under the breakthrough curve of mercury level in the column exit gas and the time to reach 100% (i.e., the same level as in the influent gas) breakthrough. The results are presented in Table 2 below.

TABLE 2

Mercury Removal* Results by URS Laboratories**

| Sample (with explanation) | Mercury removed as Elemental | Mercury Removed as $HgCl_2$ | By Sorbent only, not ash (elemental) | By Sorbent only, not ash ($HgCl_2$) |
|---|---|---|---|---|
| Western Ash, not impregnated | 0 | 3 | ND/NA | ND/NA |
| Western Ash, impregnated | 1 | 39 | 50 | 1800 |
| Eastern Ash, not impregnated | 1 | 6 | ND/NA | ND/NA |
| Eastern Ash, impregnated | 7 | 94 | 300 | 4400 |
| FGD, Norit Carbon | 1020 | 1054 | 1020 | 1054 |

*= microgram of mercury/gram of sorbent with ash or without ash (calculated)
ND/NA = Not Determined/Not Applicable.
**= URS-Radian Coporation, P.O. Box 201088, Austin, Texas 78720-1088, independent testing laboratory for mercury adsorption.
results obtained by multiplying the net (difference between sorbent containing sample and that on the corresponding fly ash only) by 50 (2% sorbent on ash).

The results in Table 2 above indicate that the sorbent only as produced on the eastern ash absorbed significantly more (4400 vs. 1054) ionized mercury (HgCl2) than the FGD carbon, a material well known as a standard for mercury removal. The sorbent removed more oxidized, mercuric chloride, mercury (1800 vs. 1054) than the FGD carbon when it was also produced on the western ash. The sorbent capacities for the elemental mercury were less than the FGD carbon. It is however, believed that capacities for the elemental mercury can be increased by lowering the level of sulfur in the sorbent and/or by changing its specificity by selecting something other than sulfur.

Example 10

Tests were conducted for mercury sorption (removal) on sorbents prepared from powdered sugar as the sorbent precursor, powdered ammonium sulfate as the catalyst or initiator and various compounds as dry powder that introduce specificity to the sorbent in the fly ash matrix. The mixture of the specific powdered formulation, that is, the sorbent precursor (powder sugar), ammonium sulfate and the specificity introducing compounds were mixed with fly ash, either Eastern or Western, was heat treated at 305° F. in a gas fired oven to prepare the sorbent mixed or diluted with any of the fly ashes.

For example, 9.6 grams of either Eastern or Western ash (sieved through 100 mesh screen) was mixed with 0.4 g of a mixture of confectioner grade sugar, available as 10× from Domino Sugar company, and ammonium sulfate at 5% level (made by mixing 95 gram sugar and 5 gram ammonium sulfate) in the sugar. This sugar, ammonium sulfate and ash mixture was then mixed with 0.02 gram of sulfur flower, or 0.02 gram of basic copper carbonate, or 0.02 gram of silver nitrate, or 0.02 gram of copper sulfate, or 0.02 gram of copper oxychloride, all as powders. Each mixture was mixed together thoroughly. Sorbent samples on Eastern or Western ash was also prepared without the specificity introducing compound, for example, by mixing 9.6 gram of the respective ash with 0.4 gram of confectioner sugar containing 5% ammonium sulfate in it. The prepared mixtures were then heated in a gas fired oven set to reach 305° F. in 10 minutes starting from room temperature. The samples were left in the oven at 305° F. for an additional twenty minutes, cooled to room temperature and then tested for mercury removal from a simulated flue gas stream by URS lab of Austin, Tex. The test samples for mercury removal are designated as follows:

E-ND-02: Eastern Ash containing only the sorbent (sugar-charred)

E-CS-02: Eastern Ash containing sorbent and Cupric Sulfate

E-AN-02: Eastern Ash containing sorbent and Silver Nitrate
E-CC-02: Easten Ash containing sorbent and Basic Cupric Carbonate
W-CC-02: Western Ash containing sorbent and Basic Cupric Carbonate
W-CCL-02: Western Ash containing sorbent and Copper Oxy Chloride
Norit FGD: Norit Carbon

TABLE 3

Mercury Removal* tests by URS Laboratories**

| Sorbent Name | Net Mercury removed as elemental Mercury | Net Mercury removed as oxidized mercury; microgram of Hg per gram sorbent | Net Mercury Removed by pure sorbent only, calculated by multiplying by 50 (elemental/Oxidized) |
| --- | --- | --- | --- |
| E-ND-02 | 6 | 20 | 300/1000 |
| E-CS-02 | ND | 115 | ND/5750 |
| E-AN-02 | ND | 1 | ND/50 |
| E-CC-02 | 5 | 93 | 300/4650 |
| W-AN-02 | 3 | ND | 150/ND |
| W-CC-02 | 5 | ND | 250/ND |
| W-CCL-02 | 26 | ND | 1300/ND |
| Norit FGD# | 1020 | 1054 | Not Applicable |

*= microgram of mercury/gram of sorbent (With or without the dopant salt) as prepared on ash or without ash (calculated) by multiplying by 50 to calculate only the sorbent plus dopant adsorption capacity.
ND/NA = Not Determined/Not Applicable.
**= URS-Radian Corporation, P.O. Box 201088, Austin, Texas 78720-1088, independent testing laboratory for mercury adsorption.
= Average of 8 tests The mercury adsorption/removal tests were conducted at 275° F. in a flowing test apparatus. The sorbent, in this case containing ~2% sorbent in the fly ash, was mixed with quartz (−50+70 mesh), placed as a column 0.5" dia×2" deep and maintained at 275° F. The simulated gas containing mercury either as elemental or as $HgCl_2$ was passed through the column at about 1 liter per minute until 100% breakthrough of mercury from the column occurred. The capacity of mercury was determined from the area under the breakthrough plot of mercury level in the column exit gas and the time to reach 100% (i.e., the same level as in the influent gas) breakthrough.

The data presented in table 3 above indicate that samples prepared on either Eastern or Western Fly Ash are effective in removing both forms of mercury, either elemental or oxidized mercury. These mercury removal values are net pick-up of mercury, that is over and above what is picked up by the ash alone. Test results show that preparations when made as disclosed in the invention is quite useful in removing mercury present in flue gases.

Although it is believed, which is not to be construed as limiting the scope and the spirit of the invention in any shape, way, or form, that the charred sorbent(s) produced from the use of the composition as disclosed herein, removes mercury by a combination of physical and chemical sorption reactions, the sorbents so produced will also have the chemical and physical properties similar to that of carbon. As such it is also expected that the materials generated in-situ as disclosed herein can be effective for other use or uses. The materials so generated can be utilized as a catalyst for the removal of NOx in presence of ammonia, either added or generated in-situ by utilizing any of the compound or compounds known for that, at temperatures above 800° F. It can also oxidize $SO_2$ (sulfur dioxide) to $SO_3$ (sulfur trioxide) at temperatures between 300 and 900° F., either independently or in combination with other materials or can be utilized to absorb $SO_3$ produced or present at temperatures below 500° F. The sorbents so produced, either independently or in combination with other materials, can thus be utilized to accomplish a variety of tasks. In a fossil fuel fired system such as in a boiler, a range of temperature exists where the composition can be suitably injected to control NOx, convert $SO_2$ to $SO_3$, and/or remove mercury, dioxin and $SO_3$ present or so produced.

METHOD OF USE

The composition of the invention can be added to the flue or process gas streams at temperatures between 250 and 2000° F. but prior to the particulate control/collection device or devices. It is preferred to add/inject the liquid or solution form of the formulation to the gas stream as a fine mist utilizing one or combinations of several methods known for atomizing a liquid stream. For example, a dual fluid nozzle mounted on appropriate lance and delivery system can be utilized to inject the liquid formulation as a fine mist. When utilizing a dual fluid nozzle, compressed air or steam can be used as the second fluid for atomizing the formulation. The formulation can be diluted with inert solvents, for example water when the individual components of the invention are water soluble, to assist the atomization and to improve the fineness of the mist particle size.

The powder form of the invention, when the components are available as dry solids at room temperatures, either by itself or when mixed with other powdery materials such as fly ash, clays, silica, alumina, etc., or when made into a powder by mixing the liquid form of the formulations with appropriate amounts of the above mentioned powdery materials, such as fly ash, clays, silica, alumina, etc., to make the formulation into a free flowing powder, can be injected into the gas stream by utilizing any or combinations thereof of well known methods of injecting/blowing a powder. The powder of the invention should again be injected, between temperatures of 250 and 2000° F. and prior to the particulate control/collection device or devices.

The methods of preparing the formulation of the composition and/or injecting the prepared formulation, whether in liquid or powder form, in the gas stream will be clear to those in the arts of making chemical formulations and in the application of chemical formulations.

The invention having been thus described it will be obvious that the same may be varied in many ways without departing from the spirit and scope of the invention. All such modifications are intended to be included within the scope of the invention which is defined by the following claims.

REFERENCES CITED
U.S. Pat. Documents

| | | | |
| --- | --- | --- | --- |
| 6,447,740 | September 2002 | Caldwell, et al. | 423/210 |
| 6,439,138 | August 2002 | Teller, et al. | 110/345 |
| 6,375,909 | April 2002 | Dangtran, et al. | 423/235 |
| 6,372,187 | April 2002 | Madden, et al. | 422/171 |
| 6,258,334 | July 2001 | Gadkaree, et al. | 423/210 |
| 5,879,948 | March 1999 | Van Pelt | 436/81 |
| 5,854,948 | December 1998 | Chang, et al. | 502/417 |
| 5,672,323 | September 1997 | Bhat, et al. | 422/172 |
| 5,505,766 | April 1996 | Chang, et al. | 502/417 |
| 5,409,522 | April 1995 | Durham, et al. | 75/670 |

OTHER REFERENCES

1. Sinha, R. K. and Walker, P. L. Jr., "Removal of Mercury by Sulfurized Carbons", Carbon, Volume 10, 1972
2. Vidic, R. D. and McLaughlin, J. D., "Uptake of Elemental Mercury by Activated Carbons", Journal of A&WMA, Volume 46, March 1996
3. Mercury Study Report to Congress, EPA-452/R-97-010, Volume VIII; "An Evaluation of Mercury Control Technologies and Costs", December 1997
4. Ghorishi, S. B., Singer, C. F., Jozewicz, W. S., Sedman, C., and Srivastava, R. K., "Simultaneous Control of Mercury, SO2, and NOx by Novel Oxidized Calcium-Based Sorbents", Journal of A&WMA, Volume 52, March 2002
5. Chang, R and Offen, G. R., "Mercury Emissions Control Technologies: An EPRI Synopsis, Power Engineering, Nov. 1995, pp 51–57
6. Sjostrom, S., Ebner, T., Harrington, P., Sly, R., and Chang, R., "Field Studies of Mercury Control Using Injected Sorbents", A&WMA Annual Meeting, Session Ae-1b, 2002
7. Department of Energy (DOE)-National Energy Technology Laboratory (NETL) web site: www.netl.doe.gov/coalpower/environment/mercury for small and large field testing info.

What is claimed is:

1. A composition to remove mercury and other hazardous substances from a fluid stream at temperatures between 200 and 2000° F., consisting of a mixture of:
   (a) a poly hydroxy compound,
   (b) a catalyst selected from the group consisting of ammonium salts, sulfuric acid, zinc salts, phosphoric acid, phosphate salts, and mixture thereof,
   (c) a specificity introducing compound selected from the group consisting of elemental sulfur, ammonium sulfide, alkali metal sulfides, ammonium iodide, alkali metal iodides, metallic copper, metallic tin, metallic silver, metallic gold, salts of copper, tin, silver, gold, and mixture thereof, provided that when the composition is used at temperatures above 350° F. then the catalyst as described in (b) is eliminated.

* * * * *